(12) United States Patent
Sim et al.

(10) Patent No.: US 10,475,396 B2
(45) Date of Patent: Nov. 12, 2019

(54) ELECTRO-OPTIC DISPLAYS WITH REDUCED REMNANT VOLTAGE, AND RELATED APPARATUS AND METHODS

(71) Applicant: E Ink Corporation, Billerica, MA (US)

(72) Inventors: Teck Ping Sim, Acton, MA (US); Kenneth R. Crounse, Somerville, MA (US); Pierre-Yves Emelie, Arlington, MA (US); Karl Raymond Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/014,236

(22) Filed: Feb. 3, 2016

(65) Prior Publication Data

US 2016/0225321 A1    Aug. 4, 2016

Related U.S. Application Data

(60) Provisional application No. 62/111,927, filed on Feb. 4, 2015.

(51) Int. Cl.
*G09G 3/34*    (2006.01)
*G09G 3/20*    (2006.01)
(Continued)

(52) U.S. Cl.
CPC ............ *G09G 3/344* (2013.01); *G02F 1/167* (2013.01); *G09G 2300/08* (2013.01);
(Continued)

(58) Field of Classification Search
CPC ............ G09G 3/044; G09G 2300/08; G09G 2300/04; G09G 2320/0204;
(Continued)

(56) References Cited

U.S. PATENT DOCUMENTS 4,418,346 A    11/1983    Batchelder
5,760,761 A    6/1998    Sheridon
(Continued)

FOREIGN PATENT DOCUMENTS

CN    101908317    12/2010
EP    1099207    2/2000
(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — Xuemei Zheng
(74) *Attorney, Agent, or Firm* — Zhen Bao

(57) ABSTRACT

Electro-optic displays with reduced remnant voltage, and related apparatus and methods are provided. A remnant voltage of a pixel of an electro-optic display may be discharged by activating the pixel's transistor and setting the voltages of the front and rear electrodes of the pixel to approximately the same voltage for a specified period of time, and/or until the amount of remnant voltage remaining in the pixel is less than a threshold amount. The remnant voltages of substantially all pixels or a subset of pixels in an active matrix electro-optic display may be simultaneously discharged. The simultaneous discharge of the remnant voltages of pixels may take place when the pixels are in a same state, characterized by (1) the transistor of each pixel being active, and (2) the voltages applied to the front and rear electrodes of each pixel being approximately equal.

40 Claims, 10 Drawing Sheets

US 10,475,396 B2
Page 2

(51) Int. Cl.
 *G09G 5/00* (2006.01)
 *G02F 1/167* (2019.01)

(52) U.S. Cl.
 CPC ............ *G09G 2310/0245* (2013.01); *G09G 2310/0251* (2013.01); *G09G 2320/0204* (2013.01); *G09G 2320/0257* (2013.01); *G09G 2320/043* (2013.01)

(58) Field of Classification Search
 CPC ... G09G 2320/0257; G09G 2310/0251; G09G 3/344; G09G 2300/0819; G09G 2320/0242; G02F 1/167; G02F 1/1368; G02F 2201/121
 See application file for complete search history.

(56) References Cited

U.S. PATENT DOCUMENTS

| | | |
|---|---|---|
| 5,777,782 A | 7/1998 | Sheridon |
| 5,808,783 A | 9/1998 | Crowley |
| 5,872,552 A | 2/1999 | Gordon, II |
| 5,930,026 A | 7/1999 | Jacobson |
| 5,961,804 A | 10/1999 | Jacobson |
| 6,017,584 A | 1/2000 | Albert |
| 6,054,071 A | 4/2000 | Mikkelsen, Jr. |
| 6,055,091 A | 4/2000 | Sheridon |
| 6,067,185 A | 5/2000 | Albert |
| 6,097,531 A | 8/2000 | Sheridon |
| 6,118,426 A | 9/2000 | Albert |
| 6,120,588 A | 9/2000 | Jacobson |
| 6,120,839 A | 9/2000 | Comiskey |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,249,271 B1 | 6/2001 | Albert |
| 6,252,564 B1 | 6/2001 | Albert |
| 6,262,706 B1 | 7/2001 | Albert |
| 6,262,833 B1 | 7/2001 | Loxley |
| 6,266,038 B1 | 7/2001 | Yoshida et al. |
| 6,271,823 B1 | 8/2001 | Gordon, II |
| 6,300,932 B1 | 10/2001 | Albert |
| 6,301,038 B1 | 10/2001 | Fitzmaurice |
| 6,312,304 B1 | 11/2001 | Duthaler |
| 6,312,971 B1 | 11/2001 | Amundson |
| 6,323,989 B1 | 11/2001 | Jacobson |
| 6,327,072 B1 | 12/2001 | Comiskey |
| 6,376,828 B1 | 4/2002 | Comiskey |
| 6,377,387 B1 | 4/2002 | Duthaler |
| 6,392,785 B1 | 5/2002 | Albert |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,445,489 B1 | 9/2002 | Jacobson et al. |
| 6,459,418 B1 | 10/2002 | Comiskey |
| 6,473,072 B1 | 10/2002 | Comiskey |
| 6,480,182 B2 | 11/2002 | Turner |
| 6,498,114 B1 | 12/2002 | Amundson |
| 6,504,524 B1 | 1/2003 | Gates |
| 6,506,438 B2 | 1/2003 | Duthaler |
| 6,512,354 B2 | 1/2003 | Jacobson |
| 6,515,649 B1 | 2/2003 | Albert |
| 6,518,949 B2 | 2/2003 | Drzaic |
| 6,521,489 B2 | 2/2003 | Duthaler et al. |
| 6,531,997 B1 | 3/2003 | Gates |
| 6,535,197 B1 | 3/2003 | Comiskey |
| 6,538,801 B2 | 3/2003 | Jacobson |
| 6,545,291 B1 | 4/2003 | Amundson |
| 6,580,545 B2 | 6/2003 | Morrison |
| 6,639,578 B1 | 10/2003 | Comiskey |
| 6,652,075 B2 | 11/2003 | Jacobson |
| 6,657,772 B2 | 12/2003 | Loxley |
| 6,664,944 B1 | 12/2003 | Albert |
| 6,672,921 B1 | 1/2004 | Liang et al. |
| 6,680,725 B1 | 1/2004 | Jacobson |
| 6,683,333 B2 | 1/2004 | Kazlas |
| 6,704,133 B2 | 3/2004 | Gates |
| 6,710,540 B1 | 3/2004 | Albert |
| 6,721,083 B2 | 4/2004 | Jacobson |
| 6,724,519 B1 | 4/2004 | Comiskey |
| 6,727,881 B1 | 4/2004 | Albert |
| 6,738,050 B2 | 5/2004 | Comiskey |
| 6,750,473 B2 | 6/2004 | Amundson |
| 6,753,999 B2 | 6/2004 | Zehner |
| 6,816,147 B2 | 11/2004 | Albert |
| 6,819,471 B2 | 11/2004 | Amundson |
| 6,822,782 B2 | 11/2004 | Honeyman |
| 6,825,068 B2 | 11/2004 | Denis |
| 6,825,970 B2 | 11/2004 | Goenaga |
| 6,831,769 B2 | 12/2004 | Holman |
| 6,839,158 B2 | 1/2005 | Albert |
| 6,842,279 B2 | 1/2005 | Amundson |
| 6,842,657 B1 | 1/2005 | Drzaic |
| 6,864,875 B2 | 3/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,982,178 B2 | 1/2006 | LeCain et al. |
| 7,012,600 B2 | 3/2006 | Zehner |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,038,655 B2 | 5/2006 | Herb |
| 7,098,880 B2 | 8/2006 | Inoue et al. |
| 7,116,318 B2 | 10/2006 | Amundson et al. |
| 7,119,772 B2 | 10/2006 | Amundson |
| 7,170,670 B2 | 1/2007 | Webber |
| 7,176,880 B2 | 2/2007 | Amundson et al. |
| 7,177,066 B2 | 2/2007 | Chung |
| 7,193,625 B2 | 3/2007 | Danner et al. |
| 7,202,847 B2 | 4/2007 | Gates |
| 7,223,672 B2 | 5/2007 | Kazlas et al. |
| 7,236,291 B2 | 6/2007 | Kaga et al. |
| 7,256,766 B2 | 8/2007 | Albert et al. |
| 7,271,947 B2 * | 9/2007 | Liang .................. G02F 1/167 345/107 |
| 7,312,916 B2 | 12/2007 | Pullen |
| 7,339,715 B2 | 3/2008 | Webber et al. |
| 7,365,733 B2 | 4/2008 | Denis et al. |
| 7,369,299 B2 | 5/2008 | Sakurai et al. |
| 7,525,719 B2 | 4/2009 | Yakushiji |
| 7,561,324 B2 | 7/2009 | Duthaler et al. |
| 7,646,530 B2 | 1/2010 | Takagi et al. |
| 7,893,435 B2 | 2/2011 | Kazlas et al. |
| 8,129,655 B2 | 3/2012 | Jacobson et al. |
| 8,232,959 B2 | 7/2012 | Choi et al. |
| 8,344,975 B2 | 1/2013 | Shirouzu et al. |
| 8,477,092 B2 | 7/2013 | Neugebauer |
| 8,878,769 B2 | 11/2014 | Miyashita |
| 8,928,575 B2 | 1/2015 | Moriya et al. |
| 2002/0005832 A1 * | 1/2002 | Katase ................. G02F 1/167 345/107 |
| 2002/0060321 A1 | 5/2002 | Kazlas |
| 2002/0090980 A1 | 7/2002 | Wilcox et al. |
| 2002/0113770 A1 | 8/2002 | Jacobson et al. |
| 2003/0102858 A1 | 6/2003 | Jacobson et al. |
| 2003/0137521 A1 | 7/2003 | Zehner et al. |
| 2004/0032390 A1 * | 2/2004 | Liang .................. G02F 1/167 345/107 |
| 2004/0105036 A1 | 6/2004 | Danner et al. |

(56) References Cited

U.S. PATENT DOCUMENTS

| | | |
|---|---|---|
| 2004/0119681 A1 | 6/2004 | Albert et al. |
| 2005/0124751 A1 | 6/2005 | Klingenberg et al. |
| 2005/0285500 A1 | 12/2005 | Hattori |
| 2006/0063667 A1 | 3/2006 | Lu |
| 2006/0087479 A1 | 4/2006 | Sakurai et al. |
| 2006/0087489 A1 | 4/2006 | Sakurai et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2007/0262949 A1 | 11/2007 | Zhou |
| 2007/0268556 A1 | 11/2007 | Chopra |
| 2010/0079440 A1 | 4/2010 | Yamaguchi |
| 2010/0238106 A1 | 9/2010 | Chang et al. |
| 2014/0354615 A1 | 12/2014 | Sakamoto |
| 2015/0029431 A1* | 1/2015 | Fukai .................. G09G 3/3677 349/43 |
| 2017/0337879 A1* | 11/2017 | Oishi ...................... G02F 1/167 |

FOREIGN PATENT DOCUMENTS

| | | |
|---|---|---|
| EP | 1462847 | 9/2004 |
| EP | 1482354 | 12/2004 |
| JP | 2004109824 A | 4/2004 |
| JP | 2004163596 | 6/2004 |
| JP | 2006084617 A | 3/2006 |
| JP | 2008164843 | 7/2008 |
| JP | 2011257595 A | 12/2011 |
| JP | 2012177839 A | 9/2012 |
| JP | 2014153696 A | 8/2014 |
| KR | 1020080113998 | 12/2008 |
| TW | 200620220 | 6/2006 |
| WO | 2000036560 | 6/2000 |
| WO | 2000038000 | 6/2000 |
| WO | 2000067110 | 11/2000 |
| WO | 1999067678 | 10/2001 |
| WO | 2004079442 | 9/2004 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 773-740 Oct. 24, 1991.

Bach, U., et al., "Nanomaterials-Based Electrochromics for Paper-Quality Displays", Adv. Mater, 14(11), 845 (2002) Jun. 5, 2002.

Hayes, R.A., et al., "Video-Speed Electronic Paper Based on Electrowetting", Nature, vol. 425, Sep. 25, pp. 383-385 (2003) Sep. 25, 2003.

Kitamura, T., et al., "Electrical toner movement for electronic paper-like display", Asia Display/IDW '01, p. 1517, Paper HCS1-1 (2001) Jan. 1, 2001.

Yamaguchi, Y., et al., "Toner display using insulative particles charged triboelectrically", Asia Display/IDW '01, p. 1729, Paper AMD4-4 (2001) Jan. 1, 2001.

Korean Intellectual Property Office; PCT/US2016/016286; International Search Report and Written Opinion; dated Mar. 2, 2016.

European Patent Office, EP Appl. No. 16747156.4, Extended European Search Report, dated Jun. 11, 2018.

* cited by examiner

ELECTRO-OPTIC DISPLAYS WITH REDUCED REMNANT VOLTAGE, AND RELATED APPARATUS AND METHODS

REFERENCE TO RELATED APPLICATIONS

This application claims benefit of U.S. Provisional Application Ser. No. 62/111,927 filed on Feb. 4, 2015. This application is related to U.S. Provisional Application Nos. 62/184,076 filed on Jun. 24, 2015; 62/112,060 filed on Feb. 4, 2015; 62/219,606 filed on Sep. 16, 2015; and 62/261,104 filed on Nov. 30, 2015. The entire contents of these and all other U.S. patents and published and copending applications mentioned below are herein incorporated by reference.

BACKGROUND

Aspects of the present disclosure relate to an electro-optic display with reduced remnant voltage and to techniques for reducing remnant voltage in an electro-optic display. Some embodiments relate to an electrophoretic display with reduced remnant voltage and to techniques for reducing remnant voltage in an electrophoretic display.

SUMMARY

Even after the electro-optic display is at rest for a relatively long period of time, a remnant voltage of the electro-optic display may remain. Even low remnant voltages can give rise to artifacts in electro-optic displays. Thus, discharging a remnant voltage of an electro-optic display may improve the quality of the displayed image, even in circumstances where the remnant voltage is already low. However, conventional techniques for discharging a remnant voltage of an electro-optic display may not fully discharge the remnant voltage. Thus, techniques for more fully discharging remnant voltages from electro-optic displays are needed.

A remnant voltage of a pixel of an electro-optic display may be discharged by activating the pixel's transistor and setting the voltages of the front and rear electrodes of the pixel to approximately a same value. The pixel may discharge the remnant voltage for a specified period of time, and/or until the amount of remnant voltage remaining in the pixel is less than a threshold amount. The remnant voltages of two or more pixels in two or more rows (e.g., the remnant voltages of all pixels in two or more rows, or the remnant voltages of all pixels in all rows) of an active matrix of pixels of an electro-optic display may be simultaneously discharged by placing the selected pixels in a same state, characterized by (1) the transistor of each selected pixel being active, and (2) the voltages applied to the front and rear electrodes of each selected pixel being approximately equal.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
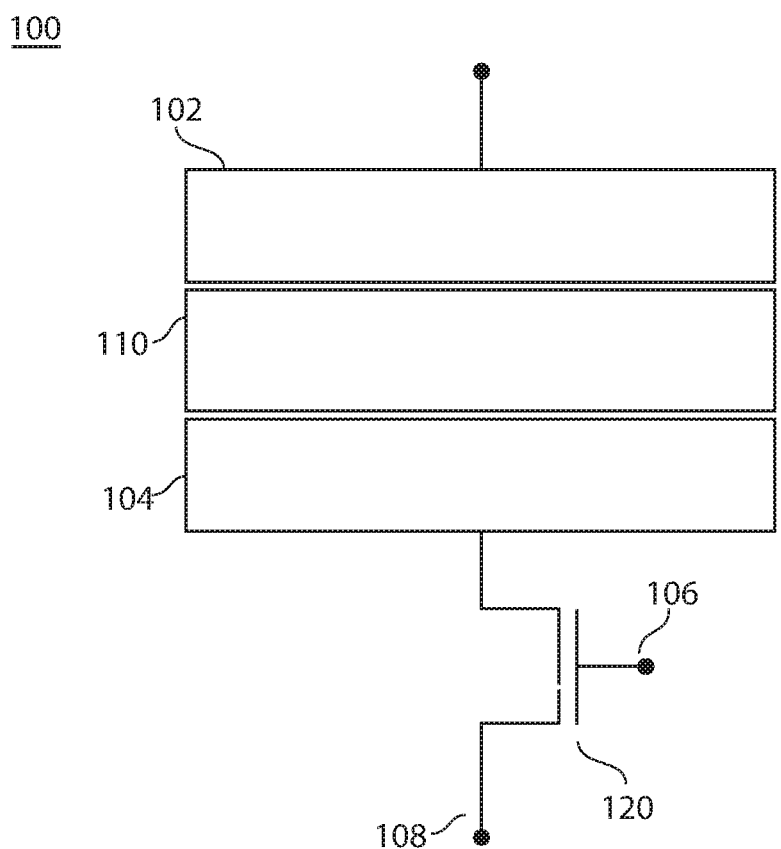
FIG. 1 is a schematic illustration of a pixel of an electro-optic display, according to some embodiments.

A remnant voltage of a pixel of an electro-optic display may be discharged by activating the pixel's transistor and setting the voltages of the front and rear electrodes of the pixel to approximately the same voltage for a specified period of time, and/or until the amount of remnant voltage remaining in the pixel is less than a threshold amount. The remnant voltages of active matrix pixels of an electro-optic display may be simultaneously discharged by placing the selected pixels in a same state, characterized by (1) the transistor of each selected pixel being active, and (2) the voltages applied to the front and rear electrodes of each selected pixel being approximately equal.

The term "remnant voltage" is used herein to refer to a persistent or decaying voltage (which also may be referred to as open-circuit electrical potential and is typically measured in volts or millivolts) that may remain in an electro-optic display after an addressing pulse (a voltage pulse used to change the optical state of the electro-optic medium) is terminated. Such remnant voltages can lead to undesirable effects on the images displayed on electro-optic displays, including, without limitation, so-called "ghosting" phenomena, in which, after the display has been rewritten, traces of the previous image are still visible.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property may be color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

In the displays of the present disclosure, the electro-optic medium may be a solid (such displays may hereinafter for convenience be referred to as "solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse used to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning in the imaging art of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071; 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (which may be, without limitation, spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium may be bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium may be bistable.

Another type of electro-optic display is the particle-based electrophoretic display, in which a plurality of charged particles move through a suspending fluid under the influence of an electric field. Some attributes of electrophoretic displays are described in U.S. Pat. No. 6,531,997, titled "Methods for Addressing Electrophoretic Displays" and issued Mar. 11, 2003, which is hereby incorporated herein in its entirety.

Electrophoretic displays can have attributes of good brightness and contrast, wide viewing angles, state bistability, and low power consumption when compared with liquid crystal displays. Nevertheless, there may be problems with the long-term image quality of some particle-based electrophoretic displays. For example, particles that make up some electrophoretic displays may settle, resulting in inadequate service-life for such displays.

As noted above, electrophoretic media may include a suspending fluid. This suspending fluid may be a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Some gas-based electrophoretic media may be susceptible to the same types of problems as some liquid-based electrophoretic media due to particle settling, when the media are used in an orientation which permits such settling, for example in a sign where the medium is disposed in a vertical plane. Indeed, particle settling appears to be a more serious problem in some gas-based electrophoretic media than in some liquid-based ones, since the lower viscosity of gaseous suspending fluids as compared with liquid ones allows more rapid settling of the electrophoretic particles.

Numerous patents and published patent applications assigned to or in the names of the Massachusetts Institute of Technology (MIT) and E Ink Corporation describe encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. The capsules may be held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; 6,753,999; 6,816,147; 6,819,471; and 6,822,782; and U.S. Patent Applications Publication Nos. 2002/0019081; 2002/0060321; 2002/0060321; 2002/0063661; 2002/0090980; 2002/0113770;

2002/0130832; 2002/0131147; 2002/0171910; 2002/0180687; 2002/0180688; 2003/0011560; 2003/0020844; 2003/0025855; 2003/0053189; 2003/0102858; 2003/0132908; 2003/0137521; 2003/0137717; 2003/0151702; 2003/0214695; 2003/0214697; 2003/0222315; 2004/0008398; 2004/0012839; 2004/0014265; 2004/0027327; 2004/0075634; 2004/0094422; 2004/0105036; 2004/0112750; and 2004/0119681; and International Applications Publication Nos. WO 99/67678; WO 00/05704; WO 00/38000; WO 00/38001; WO 00/36560; WO 00/67110; WO 00/67327; WO 01/07961; WO 01/08241; WO 03/107,315; WO 2004/023195; WO 2004/049045; WO 2004/059378; WO 2004/088002; WO 2004/088395; and WO 2004/090857.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, U.S. Pat. Nos. 6,130,774; 6,172,798; 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display may not suffer from the clustering and settling failure mode of traditional electrophoretic devices and may provide further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; inkjet printing processes; electrophoretic deposition; and other similar techniques.) Thus, the resulting display can be flexible. Further, because the display medium can be printed (using a variety of methods), the display itself can be made inexpensively.

The bistable or multi-stable behavior of particle-based electrophoretic displays, and other electro-optic displays displaying similar behavior (such displays may hereinafter for convenience be referred to as "impulse driven displays"), is in marked contrast to that of liquid crystal displays ("LCDs"). Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Also, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

The application 2003/0137521 describes how a direct current (DC) imbalanced waveform can result in a remnant voltage being created, this remnant voltage being ascertainable by measuring the open-circuit electrochemical potential of a display pixel.

For reasons explained at length in the aforementioned copending applications, when driving an electro-optic display it is desirable to use a drive scheme that is DC balanced, i.e., one which has the property that, for any sequence of optical states, the integral of the applied voltage is zero whenever the final optical state matches the initial optical state. This guarantees that the net DC imbalance experienced by the electro-optic layer is bounded by a known value. For example, a 15 V, 300 ms pulse may be used to drive an electro-optic layer from the white to the black state. After this transition, the imaging layer has experienced 4.5 Volt seconds (V·s) of DC-imbalanced impulse. To drive the film back to white, if a −15 V, 300 ms pulse is used, then the imaging layer is DC balanced across the series of transitions from white to black and, then, back to white.

It has now been found that remnant voltage is a more general phenomenon in electrophoretic and other impulse-driven electro-optic displays, both in cause(s) and effect(s). It has also been found that DC imbalances may cause long-term lifetime degradation of some electrophoretic displays.

In some embodiments described in the present disclosure, remnant voltage may be measured in electrophoretic displays by starting with a sample that has not been switched for a long period of time (e.g. hours or days). A voltmeter is applied across the open pixel circuit and a "Base Voltage" reading is measured. An electric field is then applied to the pixel, for example a switching waveform. Immediately after the waveform ends, the voltmeter is used to measure the open-circuit potential over a series of periods, and the difference between the measured reading and the original Base Voltage may be the "remnant voltage."

The remnant voltage may decay in a complex manner which may be loosely approximated mathematically as a sum of exponentials. In some experiments, 15 V was applied across the electro-optic medium for approximately 1 second. Immediately after the end of this voltage pulse, a remnant voltage of between +3 V and −3 V was measured; 1 second later a remnant voltage of between +1 V and −1 V was measured; ten minutes later the remnant voltage was near zero (relative to the original Base Voltage).

The term "remnant voltage" is sometimes used herein as a term of convenience referring to an overall phenomenon. However the basis for the switching behavior of impulse-driven electro-optic displays is the application of a voltage impulse (the integral of voltage with respect to time) across the electro-optic medium. Remnant voltage may reach a peak value immediately after the application of a driving pulse, and thereafter may decay substantially exponentially. The persistence of the remnant voltage for a significant time period applies a "remnant impulse" to the electro-optic medium, and strictly speaking this remnant impulse, rather than the remnant voltage, may be responsible for the effects on the optical states of electro-optic displays normally considered as caused by remnant voltage.

In theory, the effect of remnant voltage should correspond directly to remnant impulse. In practice, however, the impulse switching model can lose accuracy at low voltages. Some electro-optic media have a threshold, such that a remnant voltage of about 1 V may not cause a noticeable change in the optical state of the medium after a drive pulse ends. However, other electro-optic media, including preferred electrophoretic media used in experiments described herein, a remnant voltage of about 0.5 V may cause a noticeable change in the optical state. Thus, two equivalent remnant impulses may differ in actual consequences, and it may be helpful to increase the threshold of the electro-optic medium to reduce the effect of remnant voltage. E Ink has produced electrophoretic media having a "small threshold" adequate to prevent remnant voltage experienced in some circumstances from immediately changing the display image after a drive pulse ends. If the threshold is inadequate or if the remnant voltage is too high, the display may present a kickback/self-erasing or self-improving phenomenon.

Even when remnant voltages are below a small threshold, they may have a serious effect on image switching if they still persist when the next image update occurs. For example, suppose that during an image update of an electrophoretic display a +/−15 V drive voltage is applied to move the electrophoretic particles. If a +1 V remnant voltage persists from a prior update, the drive voltage would effectively be shifted from +15 V/−15 V to +16 V/−14 V. As a result, the pixel would be biased toward the dark or white state, depending on whether it has a positive or negative remnant voltage. Furthermore, this effect varies with elapsed time due to the decay rate of the remnant voltage. The electro-optic material in a pixel switched to white using a 15 V, 300 ms drive pulse immediately after a previous image update may actually experience a waveform closer to 16 V for 300 ms, whereas the material in a pixel switched to white one minute later using the exact same drive pulse (15 V, 300 ms) may actually experience a waveform closer to 15.2 V for 300 ms. Consequently the pixels may show noticeably different shades of white.

If the remnant voltage field has been created across multiple pixels by a prior image (say a dark line on a white background) then the remnant voltages may also be arrayed across the display in a similar pattern. In practical terms then, the most noticeable effect of remnant voltage on display performance may be ghosting. This problem is in addition to the problem previously noted, namely that DC imbalance (e.g. 16 V/14 V instead of 15 V/15 V) may be a cause of slow lifetime degradation of the electro-optic medium.

If a remnant voltage decays slowly and is nearly constant, then its effect in shifting the waveform does not vary from image update to update and may actually create less ghosting than a remnant voltage that decays quickly. Thus the ghosting experienced by updating one pixel after 10 minutes and another pixel after 11 minutes is much less than the ghosting experienced by updating one pixel immediately and another pixel after 1 minute. Conversely, a remnant voltage that decays so quickly that it approaches zero before the next update occurs may in practice cause no detectable ghosting.

As will be evident from the discussion above, some effects of remnant voltage may be reduced by minimizing the remnant impulse, which may be accomplished by reducing the peak remnant voltage or by increasing the decay rate. In theory, it might be predicted that if it were possible to measure remnant voltage instantaneously and perfectly after the completion of a drive pulse, the peak remnant voltage would be nearly equal in magnitude but opposite in sign to the voltage of the drive pulse. In practice, a good deal of the remnant voltage appears to decay so quickly (e.g. less than 20 ms) that the "peak" remnant voltage measured experimentally is much smaller. Thus, the "peak" remnant voltage may be reduced in practice by either (1) operating the display at a lower voltage or (2) increasing the very fast decay that occurs within the initial milliseconds after an image update and which results in very low remnant impulse. In essence, other than operating at a lower voltage, one main way to reduce remnant impulse is to increase decay rates.

There are multiple potential sources of remnant voltage. It is believed (although some embodiments are in no way limited by this belief), that a primary cause of remnant voltage is ionic polarization within the materials of the various layers forming the display.

Such polarization occurs in various ways. In a first (for convenience, denoted "Type I") polarization, an ionic double layer is created across or adjacent a material interface. For example, a positive potential at an indium-tin-oxide ("ITO") electrode may produce a corresponding polarized layer of negative ions in an adjacent laminating adhesive. The decay rate of such a polarization layer is associated with the recombination of separated ions in the lamination adhesive layer. The geometry of such a polarization layer is determined by the shape of the interface, but may be planar in nature.

In a second ("Type II") type of polarization, nodules, crystals or other kinds of material heterogeneity within a single material can result in regions in which ions can move more or less quickly than the surrounding material. The differing rate of ionic migration can result in differing degrees of charge polarization within the bulk of the medium, and polarization may thus occur within a single display component. Such a polarization may be substantially localized in nature or dispersed throughout the layer.

In a third ("Type III") type of polarization, polarization may occur at any interface that represents a barrier to charge transport of any particular type of ion. One example of such an interface in a microcavity electrophoretic display is the boundary between the electrophoretic suspension including the suspending medium and particles (the "internal phase") and the surrounding medium including walls, adhesives and binders (the "external phase"). In many electrophoretic displays, the internal phase is a hydrophobic liquid whereas the external phase is a polymer, such as gelatin. Ions that are present in the internal phase may be insoluble and non-diffusible in the external phase and vice versa. On the application of an electric field perpendicular to such an interface, polarization layers of opposite sign will accumulate on either side of the interface. When the applied electric field is removed, the resulting non-equilibrium charge distribution will result in a measurable remnant voltage potential that decays with a relaxation time determined by the mobility of the ions in the two phases on either side of the interface.

Polarization may occur during a drive pulse. Each image update is an event that may affect remnant voltage. A positive waveform voltage can create a remnant voltage across an electro-optic medium that is of the same or opposite polarity (or nearly zero) depending on the specific electro-optic display.

It will be evident from the foregoing discussion that polarization may occur at multiple locations within the electrophoretic or other electro-optic display, each location having its own characteristic spectrum of decay times, principally at interfaces and at material heterogeneities. Depending on the placement of the sources of these voltages (in other words, the polarized charge distribution) relative to the electro-active component (for example, the electrophoretic suspension), and the degree of electrical coupling between each kind of charge distribution and the motion of the particles through the suspension, or other electro-optic activity, various kinds of polarization will produce more or less deleterious effects. Since an electrophoretic display operates by motion of charged particles, which inherently causes a polarization of the electro-optic layer, in a sense a preferred electrophoretic display is not one in which no remnant voltages are always present in the display, but rather one in which the remnant voltages do not cause objectionable electro-optic behavior. Ideally, the remnant impulse will be minimized and the remnant voltage will decrease below 1 V, and preferably below 0.2 V, within 1 second, and preferably within 50 ms, so that that by introducing a minimal pause between image updates, the electrophoretic display may effect all transitions between optical states without concern for remnant voltage effects. For electrophoretic displays operating at video rates or at voltages below +/−15 V these ideal values should be correspondingly reduced. Similar considerations apply to other types of electro-optic display.

To summarize, remnant voltage as a phenomenon is at least substantially a result of ionic polarization occurring within the display material components, either at interfaces or within the materials themselves. Such polarizations are especially problematic when they persist on a meso time scale of roughly 50 ms to about an hour or longer. Remnant voltage can present itself as image ghosting or visual artifacts in a variety of ways, with a degree of severity that can vary with the elapsed times between image updates. Remnant voltage can also create a DC imbalance and reduce ultimate display lifetime. The effects of remnant voltage therefore may be deleterious to the quality of the electrophoretic or other electro-optic device and it is desirable to minimize both the remnant voltage itself, and the sensitivity of the optical states of the device to the influence of the remnant voltage.

The term L star may be used herein, and may be represented by "L*". L* has the usual CIE definition: $L^* = 116 (R/R0)^{1/3} - 16$, where R is the reflectance and R0 is a standard reflectance value).

The inventors have recognized and appreciated that the rate of decay of a remnant voltage of an electro-optic display may become low as the remnant voltage approaches a threshold value (e.g., a threshold value of approximately 200 mV). For example, even after the electro-optic display is at rest for a long period of time (e.g., 15 hours or more), a remnant voltage of the electro-optic display may remain at or near the threshold value. The inventors have also recognized and appreciated that even low remnant voltages (e.g., remnant voltages of approximately 200 mV or less) can give rise to artifacts in electro-optic displays, including, without limitation, shift in the optical state associated with an addressing pulse, drift in the optical state of the display over time, and/or ghosting.

A "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

Thus, discharging a remnant voltage of an electro-optic display may improve the quality of the displayed image, even in circumstances where the remnant voltage is already low. The inventors have recognized and appreciated that conventional techniques for discharging a remnant voltage of an electro-optic display may not fully discharge the remnant voltage. That is, conventional techniques of discharging the remnant voltage may result in the electro-optic display retaining at least a low remnant voltage. Thus, techniques for more fully discharging remnant voltages from electro-optic displays are needed.

A remnant voltage of a pixel of an electro-optic display may be discharged by activating the pixel's transistor and setting the voltages of the front and rear electrodes of the pixel to approximately a same value. The pixel may discharge the remnant voltage for a specified period of time, and/or until the amount of remnant voltage remaining in the pixel is less than a threshold amount. In some embodiments, the remnant voltages of two or more pixels in two or more rows of an active matrix of pixels of an electro-optic display may be simultaneously discharged, as opposed to simultaneously discharging only the remnant voltages of two or more pixels in the same row. That is, two or more pixels in different rows of the active matrix may simultaneously be in a same state, characterized by (1) the transistor of each of the two or more pixels being active, and (2) the voltages applied to the front and rear electrodes of each of the two or more pixels being approximately equal. When the two or more pixels are in this same state at the same time, the pixels may simultaneously discharge their remnant voltages. The period during which a pixel is in this state may be referred to as a "remnant voltage discharge period." In some embodiments, the remnant voltages of all pixels in two or more rows (e.g., all pixels in all rows) of an active matrix of pixels may be simultaneously discharged, as opposed to simultaneously discharging only the remnant voltages of two or more pixels in the same row.

In some embodiments, discharging the remnant voltages of all pixels in an active matrix display module at the same time may be achieved by "turning-off" the scanning mode of the active matrix and "turning on" the non-scanning mode. Active-matrix displays typically have circuitry to control voltages of gate lines and circuitry to control source lines that scan through the gate lines and source lines to display an image. These two circuits are commonly contained within "select or gate driver" and "source driver" integrated circuits, respectively. Select and source drivers may be separate chips mounted on a display module, may be integrated into single chips holding circuitry for driving both gate and source lines, and even may be integrated with the display controller.

A preferred embodiment for dissipating remnant voltage brings all pixel transistors into conduction for an extended time. For example, all pixel transistors may be brought into conduction by bringing gate line voltage relative to the source line voltages to values that bring pixel transistors to a state where they are relatively conductive compared to the non-conductive state used to isolate pixels from source lines as part of normal active-matrix drive. For n-type thin film pixel transistors, this may be achieved by bringing gate lines to values substantially higher than source line voltage values. Forp-type thin film pixel transistors, this may be achieved by bringing gate lines to values substantially lower than source line voltage values. In an alternative embodiment, all pixel transistors may be brought into conduction by bringing gate line voltages to zero and source line voltages to a negative (or, for p-type transistors, a positive) voltage.

In some embodiments, a specially designed circuitry may provide for addressing all pixels at the same time. In a standard active-matrix operation, select line control circuitry typically does not bring all gate lines to values that achieve the above-mentioned conduction state for all pixel transistors. A convenient way to achieve this condition is afforded by select line driver chips that have an input control line that allows an external signal to impose a condition where all select line outputs receive a voltage supplied to the select driver chosen to bring pixel transistors into conduction. By applying the appropriate voltage value to this special input control line, all transistors may be brought into conduction. By way of example, for displays that have n-type pixel transistors, some select drivers have a "Xon" control line input. By choosing a voltage value to input to the Xon pin input to the select drivers, the "gate high" voltage is routed to all the select lines.

The various aspects described above, as well as further aspects, will now be described in detail below. It should be appreciated that these aspects may be used alone, all together, or in any combination of two or more, to the extent that they are not mutually exclusive.

FIG. 1 shows a schematic of a pixel 100 of an electro-optic display, according to some embodiments. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

Figure 2:
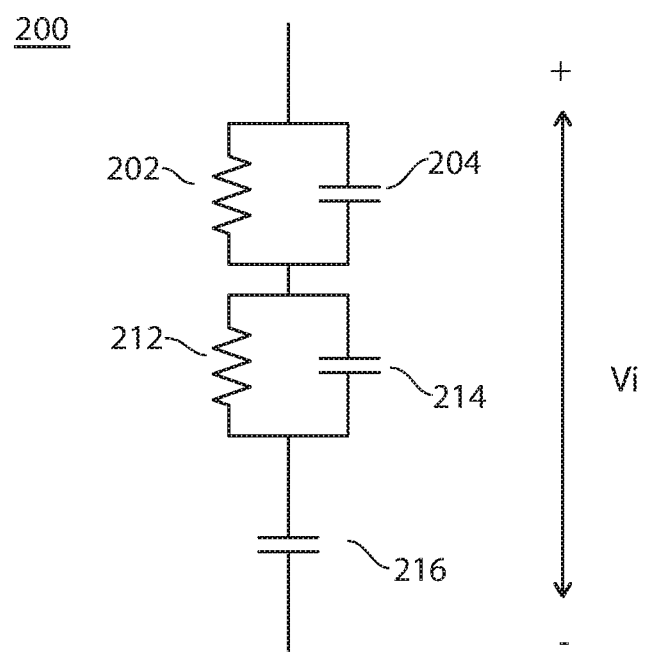
FIG. 2 is a schematic illustration of an electrical model of an imaging film, according to some embodiments.

FIG. 2 shows an electrical model of an electro-optic imaging layer 110 disposed between a front electrode 102 and a rear electrode 104, according to some embodiments. Resistance 202 and capacitance 204 may represent the resistance and capacitance of the electro-optic imaging layer 110, the front electrode 102 and the rear electrode 104, including any adhesive layers. Resistance 212 and capacitance 214 may represent the resistance and capacitance of a lamination adhesive layer. Capacitance 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Figure 3:
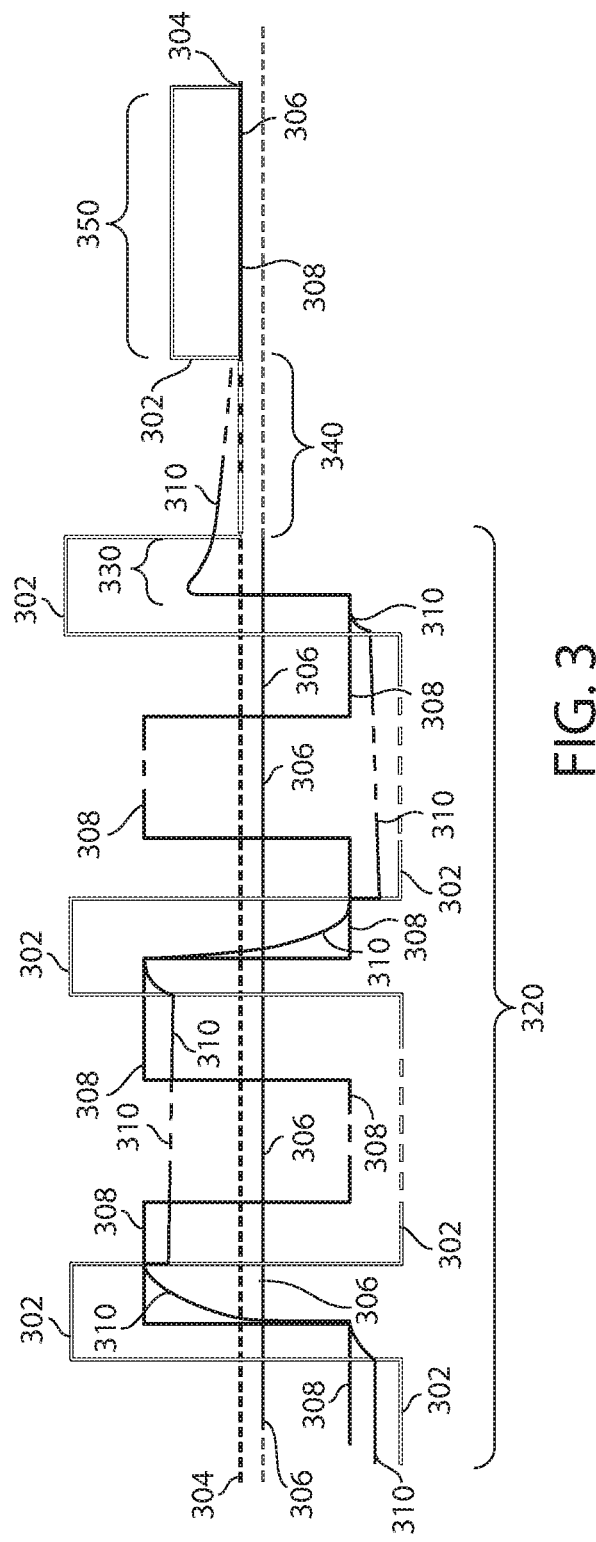
FIG. 3 illustrates an addressing pulse followed by a remnant voltage discharge pulse, according to some embodiments.
Figure 4:
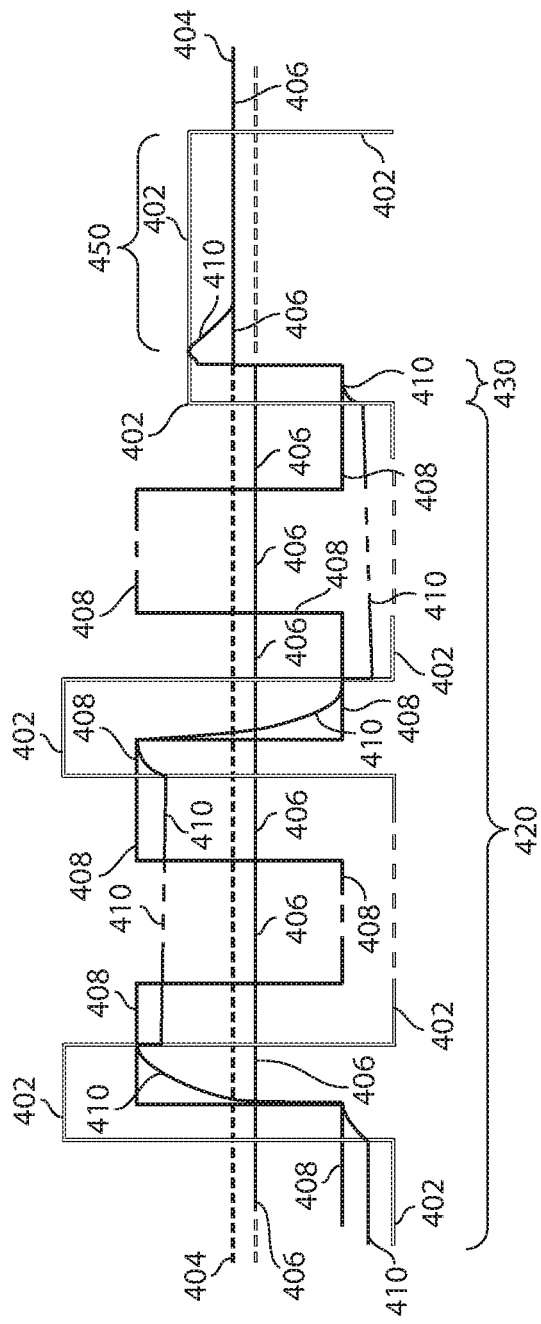
FIG. 4 illustrates an addressing pulse followed by a remnant voltage discharge pulse, according to some embodiments.

The discharge of the remnant voltage of a pixel may be initiated and/or controlled by applying any suitable set of signals to a pixel, including, without limitation, a set of signals as illustrated in FIG. 3 or a set of signals as illustrated in FIG. 4.

FIG. 3 shows a remnant voltage discharge pulse 350, according to some embodiments. As shown in the example of FIG. 3, the remnant voltage discharge pulse 350 may be preceded by an addressing pulse 320 (which may include a 'hold' frame 330) and a 'floating dwell' period 340. In the example of FIG. 3, voltage 302 is a gate voltage (e.g., the voltage applied to the gate of the pixel transistor), voltage 304 represents a reference voltage (e.g., zero volts), voltage 306 (commonly referred to as Vcom) is a voltage applied to a front electrode 102, voltage 308 is a source voltage, and voltage 310 is the voltage experienced by the electro-optic layer.

As discussed above, the rate of decay of the remnant voltage may be slower as the remnant voltage approaches a threshold value. The threshold value may vary from display to display and may depend on the type of display, the materials in the display, the use of the display and the desired performance of the display, etc. For example, a threshold value for an electrophoretic display of FIG. 3 may be less than 1V, between approximately 500 mV and approximately 1V, between approximately 300 mV and 500 mV, and/or between approximately 200 mV and 300 mV. Whereas, a remnant voltage threshold value for a different electro-optic display may be greater than 1V or less than 200 mV.

The remnant voltage discharge pulse 350 is characterized by the voltages 306 and 308 being set to approximately the same voltage 304, and the gate voltage 302 being set to a value suitable for activating the pixel's non-linear circuit element 120 (e.g., a value suitable for activating a pixel transistor). In some embodiments, the value sufficient to activate the pixel transistor may be approximately 300 mV or greater, approximately 400 mV or greater, approximately 450 mV or greater, approximately 700 mV or greater, approximately 1 V or greater, approximately 1.5 V or greater, and/or any other value greater than or equal to the pixel transistor's threshold voltage.

The period during which the remnant voltage discharge pulse 350 is applied may be referred to as the "remnant voltage discharge pulse", "discharge period", "update post drive discharge", or "uPPD". During the discharge period, pixel 100 may discharge charge carriers from imaging film 110, reducing remnant voltage. The duration of discharge period 350 may be specified by a user, determined automatically based on the remaining level of remnant voltage, and/or determined using any other suitable technique. In some embodiments, the duration of the discharge period 350 may be specified (by the user and/or automatically) such that the level of remnant voltage at the end of the discharge period is less than or equal to a threshold (e.g., 1V, 500 mV, 250 mV, 100 mV, 50 mV, 25 mV, or 0 mV, depending on the display and desired optical performance).

During 'floating dwell' period 340, pixel 100 may be placed in an electrically-floating state. The pixel may be placed in the electrically-floating state using any suitable technique, including, without limitation, setting the voltage 302 (e.g., the voltage applied to the gate of the pixel transistor) to a value suitable for de-activating the pixel transistor (e.g., a value lower than the pixel transistor's threshold voltage), and placing the pixel's front electrode in a high-impedance state. During the 'floating dwell' period, the remnant voltage may decay. In some embodiments, the remnant voltage may decay to a threshold voltage during the 'floating dwell' period.

FIG. 4 shows a remnant voltage discharge pulse 450, according to some embodiments. As shown in the example of FIG. 4, the remnant voltage discharge pulse 450 may be preceded by an addressing pulse 420 (which may include a 'hold' frame 430), without any intervening 'floating dwell' period between the addressing pulse and the discharge pulse. In the example of FIG. 4, voltage 402 is the gate voltage, voltage 404 represents a reference voltage (e.g., logic ground for controller), voltage 406 (commonly referred to as Vcom) is a voltage applied to a front electrode 102, voltage 408 is a source voltage, and voltage 410 is the voltage experienced by the electro-optic layer.

The remnant voltage discharge pulse 450 is characterized by the voltages 406 and 408 being set to approximately the same voltage 404 (i.e., ground), and the voltage 402 (e.g., the voltage applied to the gate of the pixel transistor) being set to a value suitable for activating the pixel's non-linear circuit element 120 (e.g., a value suitable for activating a pixel transistor). In some embodiments, the value sufficient to activate the pixel transistor may be approximately 300 mV or greater, approximately 400 mV or greater, approximately 450 mV or greater, approximately 700 mV or greater, approximately 1 V or greater, approximately 1.5 V or greater, and/or any other value greater than or equal to the pixel transistor's threshold voltage.

During the discharge period 450, pixel 100 may discharge charge carriers from imaging film 110, reducing remnant voltage. The duration of discharge period 450 may be specified by a user, determined automatically based on the level of remnant voltage (e.g., the level of remnant voltage at the beginning of the discharge period, or the level of remnant voltage measured during the discharge period), and/or determined using any other suitable technique. In some embodiments, the duration of the discharge period 450 may be specified (by the user and/or automatically) such that the level of remnant voltage at the end of the discharge period is less than or equal to a threshold.

In some embodiments, a method of discharging remnant voltage from an electro-optic display may include placing one or more pixels in a remnant voltage discharge state, characterized by (1) the pixel transistor of each of the one or more pixels being active, and (2) the voltages applied to the front and rear electrodes of each of the one or more pixels being approximately equal. In response to being placed in the remnant voltage discharge state, a pixel may discharge at least a portion of its remnant voltage. In some embodiments, the one or more pixels may include two or more pixels, and the two or more pixels may simultaneously discharge at least portions of their respective remnant voltages. In some embodiments, the two or more pixels may include two or more pixels in different rows of an active matrix. In some embodiments, the two or more pixels may include all or substantially all pixels of the active matrix.

Figure 5A:
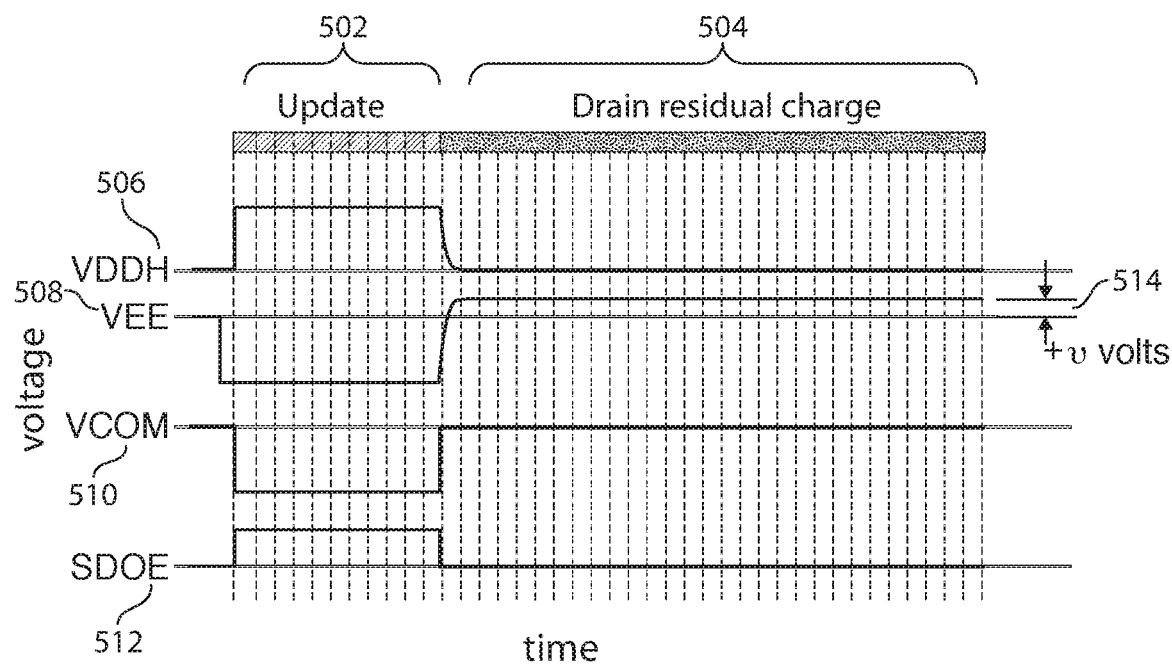
FIG. 5A is a signal-timing diagram for the driver circuit shown in FIG. 5B.
Figure 5B:
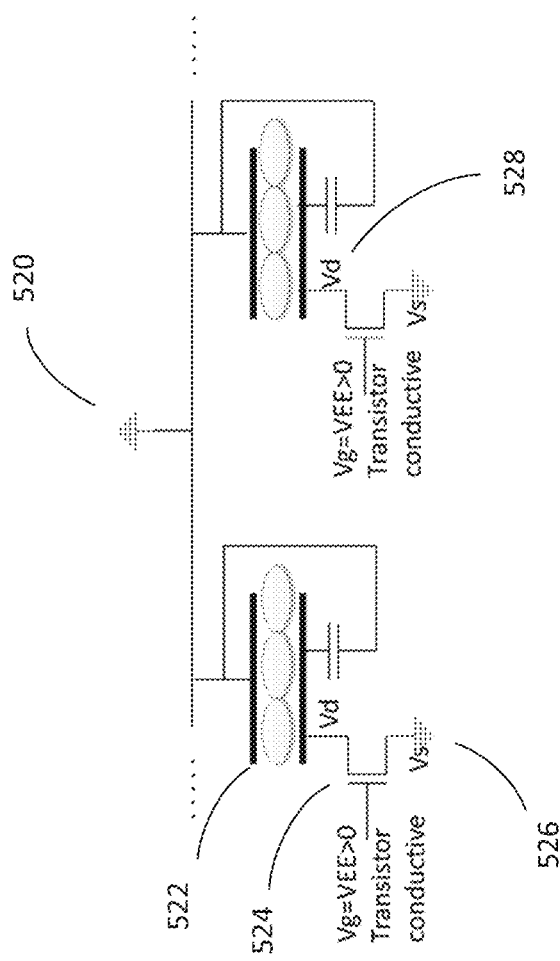

FIG. 5A depicts applied voltages over time diagram showing one method to enable non-scanning functionality in an active matrix display for the driver circuit of FIG. 5B, which shows two transistors of an active matrix display having n-type transistors and a specialized driver that enables applying positive voltage to the low level gate lines. FIG. 5A depicts applied voltages over time where a remnant voltage discharge pulse 504 is run at the end of an optical update 502 to drain residual charge. The four voltages shown are high level gate line voltage ("VDDH") 506, low level gate line voltage ("VEE") 508, front electrode voltage ("VCOM") 510 and source drive output enable voltage ("SDOE") 512. SDOE is a source drive output enable flag. When the SDOE is high, the source driver will select a VPOS and VNEG voltage depending on the waveform data to be applied to the source line (108). When the SDOE is low, the source line (108) will be grounded. Each voltage has a separate zero voltage axis which is depicted as a solid gray line. Voltages above the solid gray line indicate positive voltages while voltages below the solid gray line indicate negative voltages. The method of discharging remnant voltage shown in FIG. 5A may be accomplished by applying a positive voltage value +υ V 514 to the low gate voltage ("VEE") 508, which will engage all transistors' gates at the same time, and bringing the front plane electrode ("VCOM") 510 and the source line to ground.

FIG. 5B shows the configuration of the electrical connection of two transistors of an active matrix electro-optic display having n-type transistors and a specialized driver that enables applying positive voltage to the low level gate lines. The electro-optic film 522 connections shown include low level gate line voltage ("VEE") 524, source line voltage ("Vs") 526, drain line voltage ("Vd") 528 and front electrode voltage ("VCOM") 520. Non-scanning functionality is enabled by applying a positive voltage value to the low gate voltage ("VEE") 524 and by bringing both the front plane electrode ("VCOM") 520 and the source line to ground (by having the SDOE low).

Figure 6A:
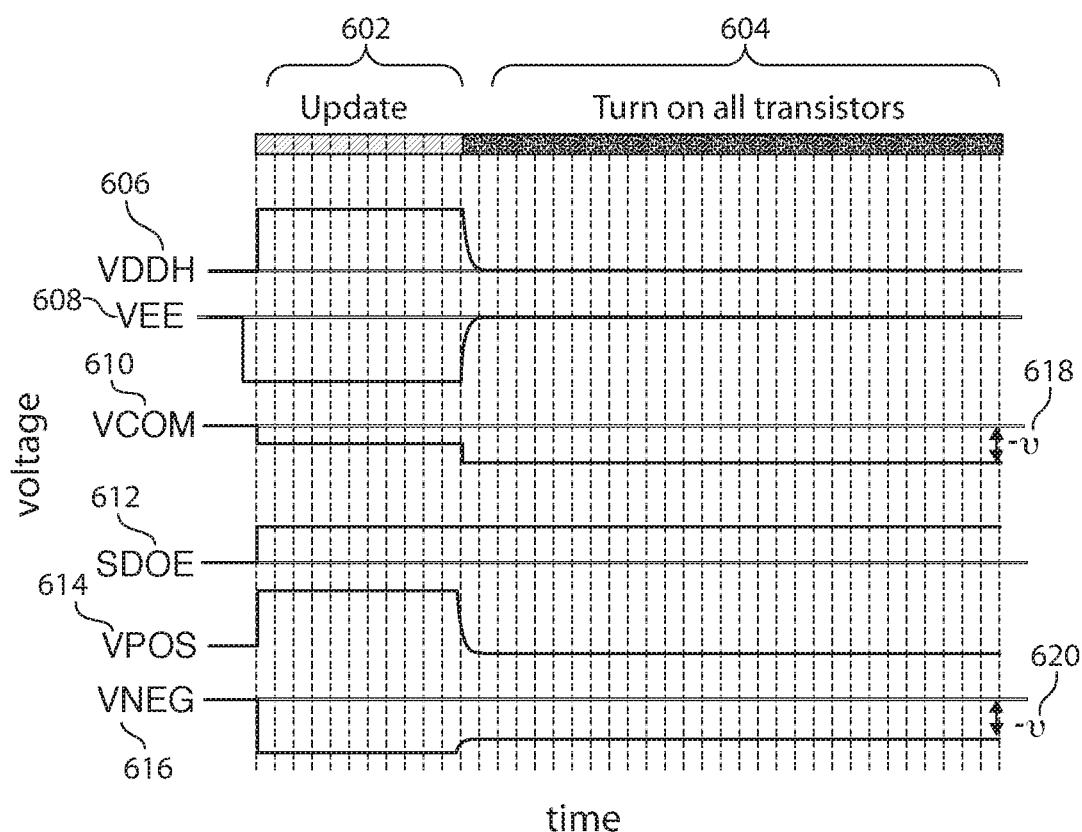
FIG. 6A is a signal-timing diagram for the driver circuit shown in FIG. 6B.

FIG. 6A shows another method to enable non-scanning functionality in an active matrix display having n-type transistors. FIG. 6A is a graphical depiction of applied voltages over time where a remnant voltage discharge pulse 604 is run at the end of an optical update 602 to drain residual charge. The six voltages shown are high level gate line voltage ("VDDH") 606, low level gate line voltage ("VEE") 608, front electrode voltage ("VCOM") 610, source drive output enable voltage ("SDOE") 612, positive voltage ("VPOS") 614 and negative voltage ("VNEG") 616. VPOS and VNEG voltages are the voltages that may be supplied to the source driver and applied to the source line 108 depending on waveform data when the SDOE is high. A negative waveform data will apply the VNEG voltage rail and a positive waveform data will apply the VPOS voltage rail. As shown in FIG. 6A, by setting SDOE high and the waveform data to negative during the remnant voltage discharge pulse 604, VNEG, having a −υ V value 618, will be applied to the source line.

In FIG. 6A, each voltage has a separate zero voltage axis which is depicted as a solid gray line. Voltages above the solid gray line indicate positive voltages while voltages below the solid gray line indicate negative voltages. The method of discharging remnant voltage shown in FIG. 6A may be accomplished by applying a sufficient negative voltage value (−υ V) 618 to the front electrode voltage ("VCOM") and approximately the same negative voltage 620 to the source line, and by grounding the gate voltage 606, 608 to create a positive voltage from gate to the source and drain line. For the n-type transistor, a positive gate-to-source voltage allows electrons to flow easily, hence turning on all the transistors. For the p-type transistor, a negative gate-to-source voltage allows electrons to flow easily, hence turning on all the transistors.

Figure 6B:
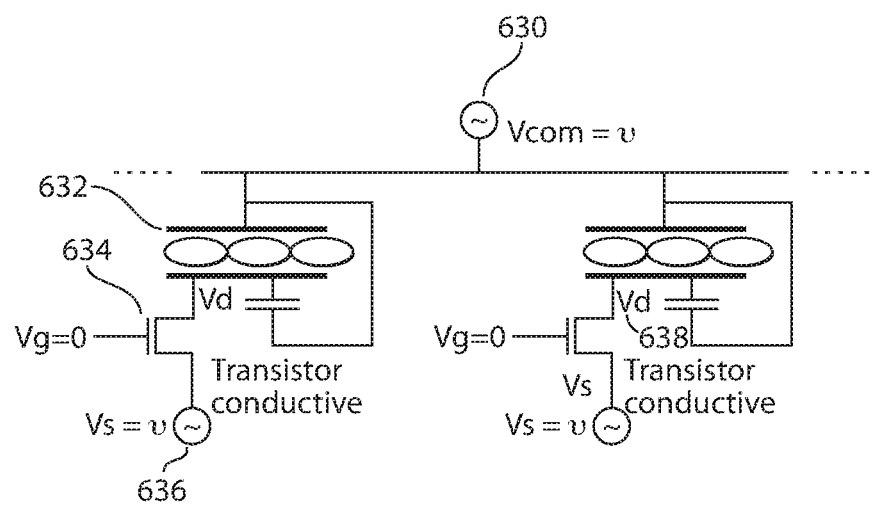

FIG. 6B shows the configuration of the electrical connection of two transistors of an active matrix electro-optic display having n-type transistors and a specialized driver that enables applying positive voltage from the gate to the source and drain lines. The electro-optic film 632 connections shown include a gate line voltage ("Vg") 634, a source line voltage ("Vs") 636, a drain line voltage ("Vd") 638 and front electrode voltage ("VCOM") 630. Non-scanning functionality is enabled by applying a zero voltage value to the gate voltage ("Vg") 634 and by bringing the voltages of both the front plane electrode ("VCOM") 630 and the source line ("Vs") 636 to a sufficient negative value ($-v$ V).

Figure 7A:
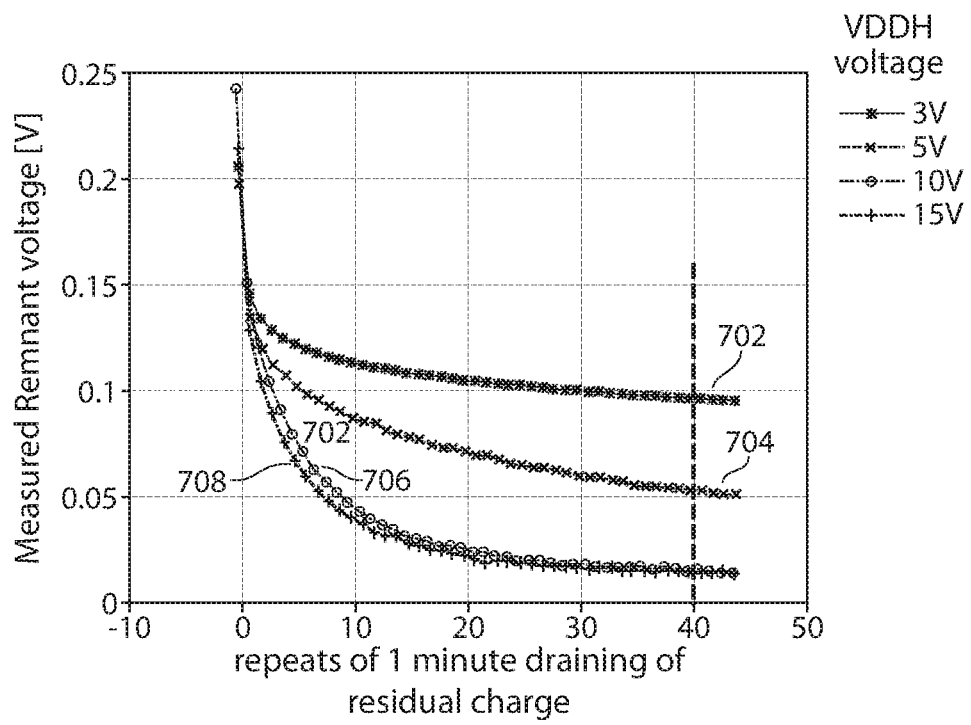
FIG. 7A is a graph showing measured remnant voltage values after repeated draining of residual charge over a range of applied voltages according to some embodiments.

FIG. 7A plots measured remnant voltage values against the number of repeats of 1 minute draining of residual charge at four different applied voltages for a particular electro-optic display configuration. At applied voltage values of 3 volts 702 and 5 volts 704, the measured remnant voltage remains between approximately 0.05 volts and 0.1 volts even after draining over 40 times. At applied gate voltage values of 10 volts 706 and 15 volts 708, the measured remnant voltage drops to less than 0.05 volts after draining approximately 15 times.

Figure 7B:
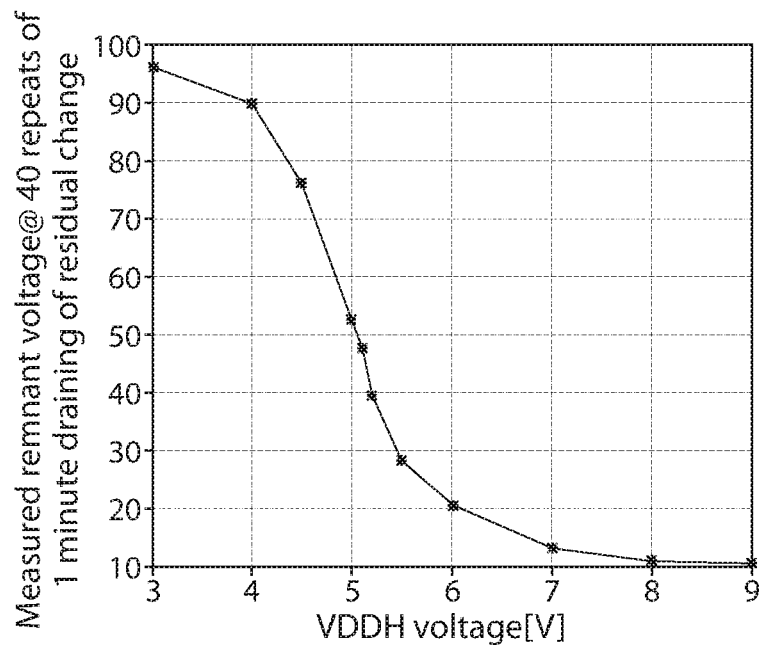
FIG. 7B is a graph showing measured remnant voltage values after 40 repeats of draining of residual charge against a range of applied voltages according to some embodiments.
Figure 8:
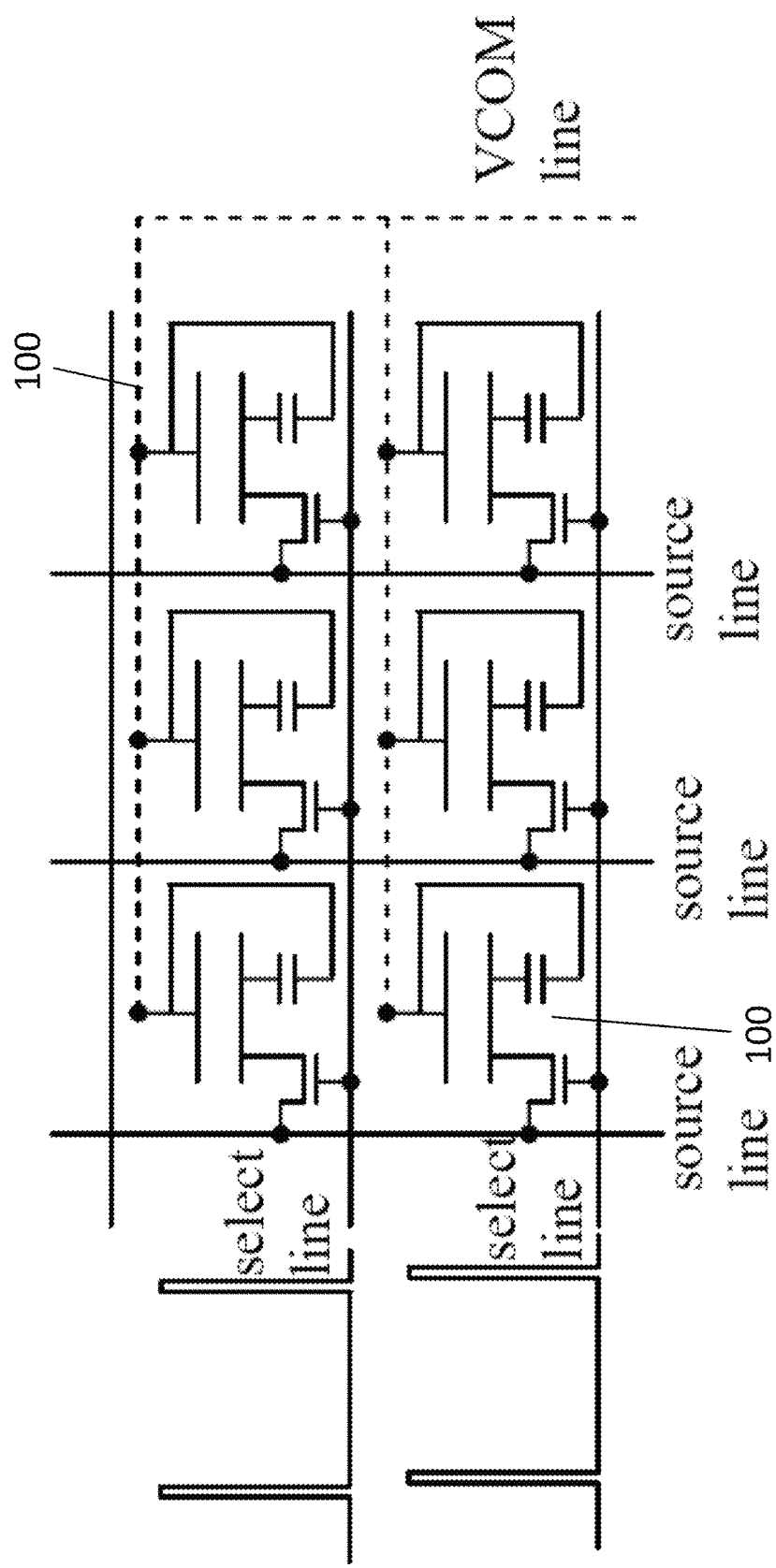
FIG. 8 is a graph showing circuits for controlling the display pixels.

FIG. 7B is a graphical depiction of measured remnant voltage after 40 repeats of 1 minute draining of remnant charge against high level gate line voltage ("VDDH") values. In these experiments, the remnant voltage drops to lower values, approximately 10 millivolts (0.010 V), only when the applied VDDH voltage is greater than 7 volts.

Discharging a pixel's remnant voltage causes a current to flow through the pixel's imaging film 110, which may alter the pixel's optical state. The term "optical kickback" is used herein to describe a change in a pixel's optical state which occurs at least partially in response to the discharge of the pixel's remnant voltage.

The frequency and/or severity of optical kickback may be reduced as the rate at which the remnant voltage is discharged decreases. In some embodiments, the rate at which a pixel's remnant voltage is discharged may be determined, at least in part, by the gate-source voltage applied to the pixel's pixel transistor. When the gate-source voltage of the pixel transistor is higher (i.e., at least twice the magnitude necessary to discharge or more) during a remnant voltage discharge period, the pixel transistor's on-resistance may be relatively low, leading to relatively rapid discharge of the remnant voltage. By contrast, when the gate-source voltage of the pixel transistor is low during a remnant voltage discharge period, the pixel transistor's on-resistance may be relatively high, leading to relatively slow discharge of the remnant voltage. In some embodiments, the gate-source voltage of the pixel transistor during a remnant voltage discharge pulse may be set to a value between the pixel transistor's threshold voltage (e.g., approximately 300 mV-1.5 V) and the pixel transistor's punch-through voltage (e.g., approximately 20 V), depending on the desired rate of discharge of the remnant voltage.

The amount of remnant voltage discharged by a pixel during a remnant voltage discharge pulse may depend, at least in part, on the rate at which the pixel discharges the remnant voltage, and on the duration of the remnant voltage discharge pulse. In some embodiments, the duration of the period during which a remnant voltage discharge pulse is applied may be at least 50 ms, at least 100 ms, at least 200 ms, at least 300 ms, or any other suitable duration. Preferably, the remnant voltage discharge period is approximately 1 sec. Optimally, the discharge period is between about 0.5 sec and about 3 secs, however, if time permits, the discharge period may be 5 secs or longer. In some embodiments, the gate-source voltage of the pixel transistor during a remnant voltage discharge period (which influences the rate at which the remnant voltage discharges) and the duration of the remnant voltage discharge period may be determined such that a specified amount of remnant voltage is discharged during the remnant voltage discharge pulse, such that substantially all the remnant voltage is discharged during the remnant voltage discharge pulse, such that the remnant voltage is discharged to a specified threshold during the remnant voltage discharge pulse, or determined in any other suitable way.

Remnant voltage discharge pulses may be applied to one or more pixels in response to any suitable event and/or at any suitable time. In some embodiments, a remnant voltage discharge pulse may be applied to a pixel after a first value is written to the pixel (e.g., after a first addressing pulse is applied to the pixel), and before a successive value is written to the pixel. In some embodiments, a remnant voltage discharge pulse may be applied to a pixel after the pixel has been updated a specified number of times. In some embodiments, a remnant voltage discharge pulse may be applied to all pixels after a value is written to any pixel in an active matrix of pixels or sometime after a value is written to any pixel in an active matrix of pixels, and before a successive update of any pixel in the active matrix. In some embodiments, a remnant voltage discharge pulse may be applied to all pixels after the display has been updated a specified number of times or after some extensive usage. In some embodiments, a remnant voltage discharge pulse may be applied to all pixels at the beginning of an active update or sometime before the start of an active update. In some embodiments, a remnant voltage discharge pulse may be applied at any time to put the display in its original electrical state, such as, to reset the performance of the display. A remnant voltage discharge pulse may be interrupted and restarted at a later time. In some embodiments, the frequency and/or severity of optical kickback may be reduced as the frequency with which the remnant voltage is discharged decreases. In some embodiments, a remnant voltage discharge pulse may be incorporated into the active update to allow for short discharging time and maintain a relatively small amount of residual charge buildup. When incorporated into the active update, a remnant voltage discharge pulse may not be interrupted. For example, in a special type of waveform that requires resetting, the remnant voltage discharge process would form the first part of the active update to discharge the remnant voltage and the optical waveform would form the second art of the active update to change the image being displayed.

In some embodiments, during a period in which the remnant voltage is discharged from one or more pixels of an active matrix, the optical state of any of the one or more pixels may change by less than a threshold amount (e.g., less than 10 L*, less than 5 L*, less than 3 L*, less than 2 L*, less than 1 L*, or less than 0.5 L*).

In a segmented electro-optic display, the remnant voltage may be discharged by applying approximately the same voltage to a front electrode and a rear electrode for set amount of time or until a defined remnant voltage value is achieved.

It should be understood that the various embodiments shown in the Figures are illustrative representations, and are not necessarily drawn to scale. Reference throughout the specification to "one embodiment" or "an embodiment" or "some embodiments" means that a particular feature, structure, material, or characteristic described in connection with the embodiment(s) is included in at least one embodiment, but not necessarily in all embodiments. Consequently, appearances of the phrases "in one embodiment," "in an embodiment," or "in some embodiments" in various places throughout the Specification are not necessarily referring to the same embodiment.

Unless the context clearly requires otherwise, throughout the disclosure, the words "comprise," "comprising," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

Having thus described several aspects of at least one embodiment of the technology, it is to be appreciated that various alterations, modifications, and improvements will readily occur to those skilled in the art. Such alterations, modifications, and improvements are intended to be within the spirit and scope of the technology. Accordingly, the foregoing description and drawings provide non-limiting examples only.

The invention claimed is:

1. A method of reducing a remnant voltage of an active matrix electro-optic display having a front electrode and a plurality of pixels, the plurality of pixels each having a rear electrode, where each rear electrode is coupled to a pixel transistor associated with a respective pixel of the plurality of pixels, the method comprising:
 applying to the front electrode and to the rear electrodes of the plurality of pixels approximately the same voltage; and
 applying to the gate of each of the plurality of pixel transistors a voltage sufficient to activate the plurality of pixel transistors to create a conduction path for draining the remnant voltage, wherein the voltage is applied until a set remnant voltage value is achieved.

2. The method according to claim 1, further comprising n-type pixel transistors, wherein the gate voltage to the pixel transistors is about 300 mV or greater.

3. The method according to claim 1, further comprising n-type pixel transistors, wherein the gate voltage to the pixel transistors is about 450 mV or greater.

4. The method according to claim 1, further comprising n-type pixel transistors, wherein the gate voltage to the pixel transistors is about 700 mV or greater.

5. The method according to claim 1, further comprising n-type pixel transistors, wherein the gate voltage to the pixel transistors is about 1 V or greater.

6. The method according to claim 1, further comprising n-type pixel transistors, wherein the gate voltage to the pixel transistors is about 2 V or greater.

7. The method according to claim 1, further comprising n-type pixel transistors, wherein the gate voltage to the pixel transistors is between about 2 V and about 8 V.

8. The method according to claim 1, further comprising n-type pixel transistors, wherein the gate voltage to the pixel transistors is between about 1 V and about 25 V.

9. The method according to claim 1, further comprising n-type pixel transistors, wherein the gate voltage to the pixel transistors is equal to or greater than the pixel transistor's activation voltage.

10. The method according to claim 1, further comprising p-type pixel transistors, wherein the gate voltage to the pixel transistors is about −300 mV or less.

11. The method according to claim 1, further comprising p-type pixel transistors, wherein the gate voltage to the pixel transistors is about −450 mV or less.

12. The method according to claim 1, further comprising p-type pixel transistors, wherein the gate voltage to the pixel transistors is about −700 mV or less.

13. The method according to claim 1, further comprising p-type pixel transistors, wherein the gate voltage to the pixel transistors is about −1 V or less.

14. The method according to claim 1, further comprising p-type pixel transistors, wherein the gate voltage to the pixel transistors is about −2 V or less.

15. The method according to claim 1, further comprising p-type pixel transistors, wherein the gate voltage to the pixel transistors is between about −2 V and about −8 V.

16. The method according to claim 1, further comprising p-type pixel transistors, wherein the gate voltage to the pixel transistors is between about −1 V and about −25 V.

17. The method according to claim 1, further comprising p-type pixel transistors, wherein the gate voltage to the pixel transistors is equal to or less than the pixel transistor's activation voltage.

18. The method according to claim 1, wherein the voltages are applied for a set duration.

19. The method according to claim 18, wherein the voltages are applied for about 50 ms to about 300 ms.

20. The method according to claim 18, wherein the voltages are applied for about 300 ms to about 500 ms.

21. The method according to claim 18, wherein the voltages are applied for about 500 ms to about 1 sec.

22. The method according to claim 18, wherein the voltages are applied for about 500 ms to about 3 secs.

23. The method according to claim 18, wherein the voltages are applied for about 3 secs or longer.

24. The method according to claim 1, wherein the voltages are applied until the remnant voltage value is equal to or less than 1V.

25. The method according to claim 1, wherein the voltages are applied until the remnant voltage value is equal to or less than about 500 mV.

26. The method according to claim 1, wherein the voltages are applied until the remnant voltage value is equal to or less than about 300 mV.

27. The method according to claim 1, wherein the voltages are applied until the remnant voltage value is equal to or less than about 100 mV.

28. The method according to claim 1, wherein the voltages are applied until the remnant voltage value is about 0 mV.

29. The method according to claim 1, wherein substantially all of the pixel transistors are activated concurrently using a driver.

30. The method according to claim 1, wherein the voltage applied to the front and rear electrodes is greater than or less than 0V.

31. The method according to claim 1, wherein the electro-optic display is an electrophoretic display.

32. The method according to claim 1, further comprising:
 a floating dwell period, wherein the gate voltage is set to a value to deactivate the pixel transistor for a set duration or until a set remnant voltage value is achieved.

33. A method of reducing remnant voltage of an active matrix electro-optic display having a front electrode and a plurality of pixels each having a rear electrode, where each rear electrode is coupled to a n-type pixel transistor associated with a respective pixel of the plurality of pixels, the method comprising:

grounding the source of each of the n-type pixel transistors;

applying a positive voltage to the gate of each of the n-type pixel transistors to activate the n-type transistors, wherein the voltage is applied until a set remnant voltage value is achieved; and grounding the front electrode to create a conduction path for draining the remnant voltage.

34. The method according to claim 33, wherein substantially all of the pixel transistors are activated concurrently using a driver.

35. A method of reducing remnant voltage of an active matrix electro-optic display having a front electrode and a plurality of pixels each having a rear electrode, where each rear electrode is coupled to a p-type pixel transistor associated with a respective pixel of the plurality of pixels, the method comprising:

grounding the source of each of the p-type pixel transistors;

applying a negative voltage to the gate of each of the p-type pixel transistors to activate the p-type transistors, wherein the voltage is applied until a set remnant voltage value is achieved; and grounding the front electrode to create a conduction path for draining the remnant voltage.

36. The method according to claim 35, wherein substantially all of the pixel transistors are activated concurrently using a driver.

37. A method of reducing remnant voltage of an active matrix electro-optic display having a front electrode, a plurality of pixels each having a rear electrode, where each rear electrode is coupled to a n-type pixel transistor associated with a respective pixel of the plurality of pixels, the method comprising:

applying to the front electrode a negative voltage;

applying to the source of each of the n-type pixel transistors approximately the same negative voltage as the front electrode; and grounding the gate of each of the n-type pixel transistors to create a conduction path for draining the remnant voltage.

38. The method according to claim 37, wherein the electro-optic display is an electrophoretic display.

39. A method of reducing remnant voltage of an active matrix electro-optic display having a front electrode and a plurality of pixels each having a rear electrode, where each rear electrode is coupled to a p-type pixel transistor associated with a respective pixel of the plurality of pixels, the method comprising:

applying to the front electrode a positive voltage;

applying to the source of each of the p-type pixel transistors approximately the same positive voltage as the front electrode; and grounding the gate of each of the p-type pixel transistors to create a conduction path for draining the remnant voltage.

40. The method according to claim 39, wherein the electro-optic display is an electrophoretic display.

* * * * *